United States Patent
Gao et al.

(10) Patent No.: US 8,338,005 B2
(45) Date of Patent: Dec. 25, 2012

(54) RECORDING LAYER AND MULTILAYERED SOFT UNDERLAYER

(75) Inventors: Kaizhong Gao, Eden Praire, MN (US);
Qixu Chen, Milpitas, CA (US);
Chung-Hee Chang, Fremont, CA (US);
Thomas Patrick Nolan, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 395 days.

(21) Appl. No.: 12/353,229

(22) Filed: Jan. 13, 2009

(65) Prior Publication Data

US 2010/0177439 A1 Jul. 15, 2010

(51) Int. Cl.
*G11B 5/667* (2006.01)

(52) U.S. Cl. ......................................... 428/827; 428/829

(58) Field of Classification Search ........................ None
See application file for complete search history.

(56) References Cited

U.S. PATENT DOCUMENTS

| | | | | |
|---|---|---|---|---|
| 4,894,098 | A * | 1/1990 | Otomo et al. | 148/122 |
| 6,890,667 | B1 * | 5/2005 | Lairson et al. | 428/611 |
| 2002/0127433 | A1 * | 9/2002 | Shimizu et al. | 428/694 TM |
| 2003/0161077 | A1 * | 8/2003 | Kawawake et al. | 360/324.1 |
| 2007/0003792 | A1 * | 1/2007 | Covington et al. | 428/812 |

OTHER PUBLICATIONS

Parkin, S. S. P., Phys. Rev. Let., 67(25), 1991, 3598-3601.*
M.U. Khan & R.H. Victora, "Prediction of spike noise based on soft underlayer energy minimization," Journal of Applied Physics 97, 10N502, 2005.
K.Z. Gao & H.N. Bertram,"Write field analysis and write pole design in perpendicular recording," IEEE Transactions on Magnetics, vol. 38, issue 5, 3521-27, Sep. 2002.

* cited by examiner

*Primary Examiner* — Kevin Bernatz

(57) ABSTRACT

A media for perpendicular recording and a method of creating the media is provided. The media includes a hard recording layer and a soft underlayer (SUL). The SUL is composed of at least two anti-ferromagnetically coupled (AFC) sub-underlayers. The sub-underlayers respond to a magnetic field established during dynamic reversal with respective magnetic fields. The sub-underlayers are formed and disposed to differ in one or more magnetic moment, anisotropy, and thickness, so that their respective magnetic fields constructively interfere in one or more points in the hard recording layer, thereby reducing a total SUL magnetic field response to the dynamic reversal field approximately to zero at one or more points in the hard recording layer, which reduces side track erasure.

15 Claims, 4 Drawing Sheets

RECORDING LAYER AND MULTILAYERED SOFT UNDERLAYER

BACKGROUND

1. Field

This invention is directed to recording media with reduced unintentional erasure. In particular, the invention is directed to methods, systems and components that allow for reduced sidetrack erasure (STE).

2. Related Arts

Magnetic media are widely used in various applications, particularly in the computer industry for data/information storage and retrieval applications, typically in disk form, and efforts are continually made with the aim of increasing the areal recording density, i.e., bit density of the magnetic media. Conventional thin-film type magnetic media, wherein a fine-grained polycrystalline magnetic alloy layer serves as the active recording layer, are generally classified as "longitudinal" or "perpendicular" depending upon the orientation of the magnetic domains of the grains of magnetic material.

Perpendicular recording media (recording media with a perpendicular anisotropy (Hk) in the magnetic layer and magnetization forming in a direction perpendicular to the surface of the magnetic layers) have been found to be superior to longitudinal media in achieving very high bit densities without experiencing the thermal stability limit associated with the latter. In perpendicular magnetic recording media, residual magnetization is formed in a direction ("easy axis") perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

Typically, perpendicular recording media are fabricated with polycrystalline CoCr or CoPt-oxide containing films. Co-rich areas in the polycrystalline film are ferromagnetic while Cr or oxide rich areas in the film are non-magnetic. Magnetic interaction between adjacent ferromagnetic domains is attenuated by nonmagnetic areas in between.

A traditional, perpendicular magnetic medium utilizes multiple layer interposition including a relatively thick (as compared with the magnetic recording layer), "soft" magnetically permeable underlayer ("SUL"), i.e., a magnetic layer having a relatively low coercivity below about 1 kOe, such as of a NiFe alloy (Permalloy), (or a material that is easily magnetized and demagnetized), between a non-magnetic interlayer, e.g., of glass, aluminum (Al) or an Al-based alloy, and a magnetically "hard" recording layer having relatively high coercivity, typically about 3-8 kOe, e.g., of a cobalt-based alloy (e.g., a Co—Cr alloy such as CoCrPtB) (or a material that neither magnetizes nor demagnetizes easily) having perpendicular anisotropy. The magnetically soft underlayer serves as a magnetic flux return path for the field from the write pole to the return pole of the recording head. See U.S. Publication No. 20070287031 and U.S. Pat. No. 6,914,749.

A typical conventional perpendicular recording system with a perpendicularly oriented magnetic medium and a magnetic transducer head commonly comprises a non-magnetic substrate, an optional adhesion layer, a relatively thick magnetically soft underlayer (SUL), an interlayer stack comprising at least one non-magnetic interlayer, sometimes referred to as an "intermediate" layer, and at least one relatively thin magnetically hard perpendicular recording layer with its magnetic easy axis perpendicular to the film plane. The interlayer stack preferably includes at least one interlayer of an hcp (hexagonally close packed) material adjacent the magnetically hard perpendicular recording layer and an optional seed layer adjacent the magnetically soft underlayer (SUL), preferably comprising at least one of an amorphous material and an fcc material.

A recording system further comprises main (writing) and auxiliary poles of the magnetic transducer head. A relatively thin interlayer, comprised of one or more layers of non-magnetic materials, serves to (1) prevent magnetic interaction between the magnetically soft underlayer and the at least one magnetically hard recording layer; and (2) promote desired microstructural and magnetic properties of the at least one magnetically hard recording layer.

Magnetic flux ($\phi$), emanates from the main writing pole of a magnetic transducer head, enters and passes through the at least one vertically oriented, magnetically hard recording layer in the region below main pole, enters and travels within the SUL for a distance, and then exits therefrom and passes through the at least one perpendicular hard magnetic recording layer in the region below the auxiliary pole of the transducer head.

Completing the layer stack of the medium is a protective overcoat layer, such as of a diamond-like carbon (DLC), formed over magnetically hard layer, and preferably a lubricant topcoat layer, such as of a perfluoropolyether (PFPE) material, formed over the protective overcoat layer. The protective overcoat protects the magnetic recording layer from corrosion and reduces frictional forces between the disc and a read/write head. In addition, a thin layer of lubricant may be applied to the surface of the protective overcoat to enhance the tribological performance of the head-disc interface by reducing friction and wear of the protective overcoat.

The substrate is typically disk-shaped and comprised of a non-magnetic metal or alloy, e.g., Al or an Al-based alloy, such as Al—Mg having a Ni—P plating layer on the deposition surface thereof, or alternatively, the substrate is comprised of a suitable glass, ceramic, glass-ceramic, polymeric material, or a composite or laminate of these materials. The optional adhesion layer, if present on the substrate surface, typically comprises a less than about 200 Angstrom (Å) thick layer of a metal or a metal alloy material such as Ti, a Ti-based alloy, Ta, a Ta-based alloy, Cr, or a Cr-based alloy. The relatively thick soft magnetic underlayer is typically comprised of an about 50 to about 300 nm thick layer of a soft magnetic material such as Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC. The relatively thin interlayer stack typically comprises an about 50 to about 300 Å thick layer or layers of non-magnetic material(s). The interlayer stack includes at least one interlayer of an hcp material, such as Ru, TiCr, Ru/CoCr 37 Pt 6, RuCr/CoCrPt, etc., adjacent the magnetically hard perpendicular recording layer. When present, a seed layer adjacent the magnetically soft underlayer (SUL) may typically include a less than about 100 Å thick layer of an FCC material, such as an alloy of Cu, Ag, Pt, or Au, or an amorphous or fine-grained material, such as Ta, TaW, CrTa, Ti, TiN, TiW, or TiCr. The at least one magnetically hard perpendicular recording layer is typically comprised of an about 10 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd.

Of the conventional media types described above, longitudinal media are more developed than perpendicular media and have been utilized for several decades in the computer industry. During this interval, components and sub-systems, such as transducer heads, channels, and media, have been repeatedly optimized in order to operate efficiently within computer environments. However, it is a common current belief that longitudinal recording is reaching the end of its lifetime as an industry standard in computer applications owing to physical limits, which effectively prevent further increases in areal recording density.

Perpendicular media, on the other hand, are expected to replace longitudinal media in computer-related recording applications and continue the movement toward ever-increasing areal recording densities far beyond the capability of longitudinal media. However, perpendicular media and recording technology are less well developed than all facets of longitudinal media and recording technology. Specifically, each individual component of perpendicular magnetic recording technology, including transducer heads, media, and recording channels, is less developed and optimized than the corresponding component of longitudinal recording technology. Consequently, the benefits observed with perpendicular media and systems vis-à-vis the prior art, i.e., longitudinal media and systems, are yet to be fully realized.

One of the dominant issues facing perpendicular recording is unintentional erasure, particularly sidetrack erasure (STE). FIG. 1 shows a prior art perpendicular recording system 100 illustrating one of the mechanisms for STE. Write head 105 emits a magnetic field (shown by the downward arrows) through overcoat 140 and into hard recording layer 130, where the magnetic field causes data to be written and saved. The magnetic field then passes through interlayer 120 into SUL 110. For a single layer SUL 110, the SUL is typically aligned in the cross track direction. There are two major problems associated with such SULs: 1) due to geometric limitations, the ground state, i.e. non-writing state, of the SUL prefers to have magnetic domains 150, thus leading to large noise from the SUL; and 2) (as shown in FIG. 1) during dynamic writing, the magnetization in the SUL will cause a concentration of charge 160 (a charge density) in the SUL that provide an additional field promoting erasure of the media.

FIG. 2 shows a prior art perpendicular recording system 200, similar to system 100 except that SUL 210 has two layers 212 and 214 of equal thickness, which are used to attempt to overcome the STE. Layer 212 is magnetized in one direction while layer 214 is magnetized in the opposite direction. In the ground state, dual layer SUL prefers to be domain free. Dynamic reversal of the dual layer SUL generally will cause significantly less field erasure as compared to the single layer SUL case (FIG. 1). However, the impact of the demagnetization field for the same rotation of magnetization in each layer of the SUL is different; layer 212 has more impact than lower layer 214. In addition, due to recording geometry, layer 212 also has a larger rotation angle. Therefore, the SUL still responds asymmetrically during a dynamic recording process (e.g., writing of data), such that a residue charge continues to exist in the SUL, and which may contribute to sidetrack erasure of data recorded on the hard recording layer 230.

In view of the foregoing, there exists a need for improved perpendicular media and system technology. In particular, media with reduced STE would advance the adoption of perpendicular media technology.

SUMMARY

One aspect is directed toward a media for perpendicular recording and a method of creating such a media. The media includes a hard recording layer, and a soft underlayer (SUL). The SUL includes at least two anti-ferromagnetically coupled (AFC) sub-underlayers, that differ in one or more of thickness, magnetic moment, and relative positioning, such that the total magnetic field experienced by the hard recording layer during dynamic writing, resulting from the respective fields emanating from each sub-underlayer, is reduced due to destructive interference between the fields of the respective sub-underlayers. The reduction allows a reduction substantially to zero at one or more points in the hard recording layer, thereby reducing STE more than a conventional two layer SUL.

Another aspect is for a method of creating media with a hard recording layer, and a soft underlayer (SUL) exhibiting reduced STE according to the following steps. The method includes disposing two or more anti-ferromagnetically coupled (AFC) sub-underlayers on a substrate that have relative thicknesses, relative positions, and relative moments selected so that the vector sum of the magnetic fields emanating from each sub-underlayer, at a location inside the hard recording layer during dynamic reversal, is substantially zero.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DETAILED DESCRIPTION

Figure 1:
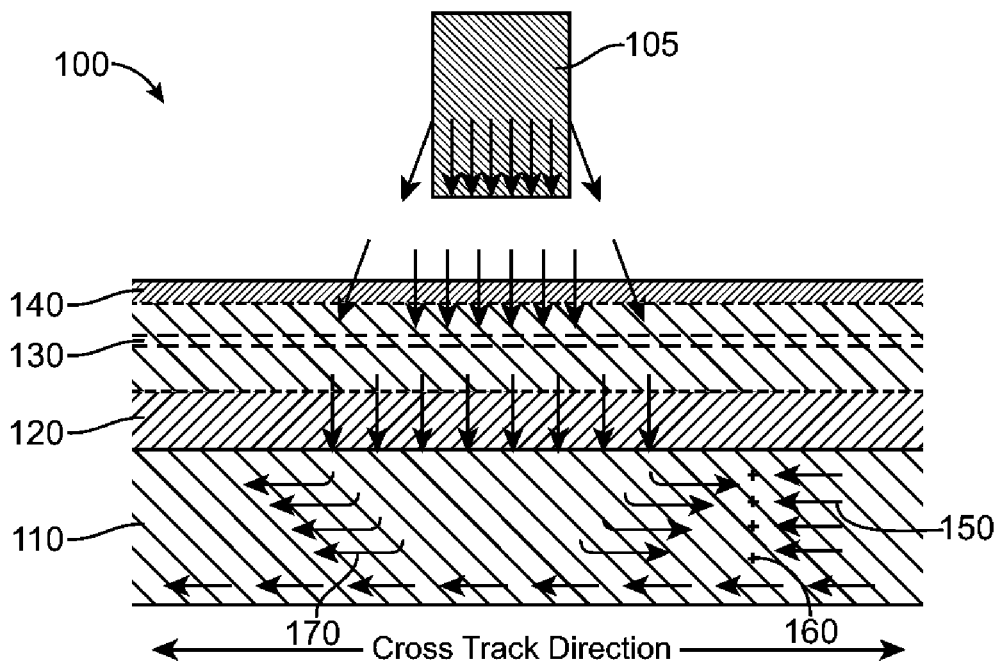
FIG. 1 depicts a known perpendicular recording media having a single layer SUL.
Figure 2:
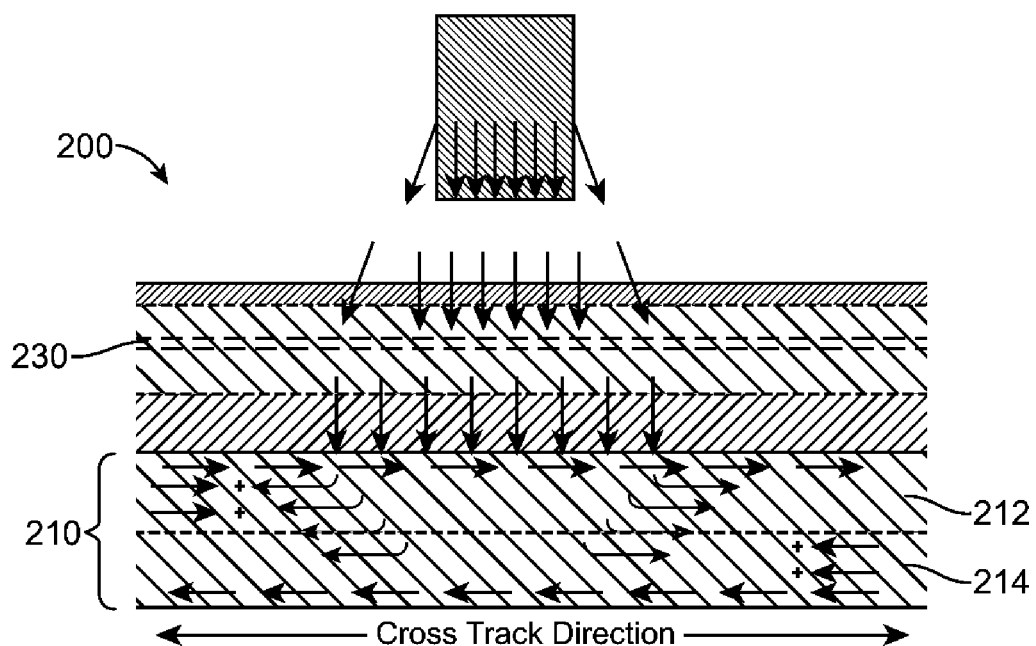
FIG. 2 depicts a second known perpendicular recording media having an SUL composed of two equal sub-underlayers.

The following description is presented to enable any person skilled in the art to make and use a method and apparatus to reduce sidetrack erasure, in accordance with embodiments and other aspects described, and is provided in the context of particular applications and their requirements. Various modifications to these embodiments and aspects will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that these embodiments and aspects might be practiced without the use of these specific details. In other instances, well-known structures and processes are shown in block diagram form in order not to obscure the description of the invention with unnecessary detail. Thus, the invention is not intended to be limited to the embodiments shown, but is to be accorded the widest scope consistent with the principles and features disclosed herein. Some aspects of the disclosure herein relate to summing magnetic fields, and in the absence of a specific teaching otherwise, such summing should be understood as a vector sum, accounting for both magnitude and direction of the fields, rather than a directionless sum (sum of magnitudes).

In order to minimize side track erasure (STE) caused by the soft underlayer (SUL), the magnetic field emanating from the SUL and experienced in the hard recording layer is reduced and, preferably is substantially equal to zero. It is possible to adjust at least one of the number of layers of the SUL (or sub-underlayers), the thicknesses of the sub-underlayers, the position of the sub-underlayers, and the moment of the sub-underlayers so that the magnetic field emanating from the SUL as a whole and experienced in the hard recording layer is minimized by cancellation of fields emanating from separate of the sub-underlayers. Preferably, the field experienced by the hard recording layer is reduced substantially to zero.

For perpendicular recording to work properly (i.e. the magnetic flux returns to the write head), the SUL needs to at least be of a certain overall thickness (h), regardless of the number of component layers in the SUL. If the SUL falls below h, there is an increasing risk of erasure, reduction of field gradient, and increasing level of SUL saturation, as the SUL thickness is further reduced. SUL thickness is governed by the following equation:

$$h_{min}^{SUL} = \gamma \frac{(u+1)W^{tip}B_s^{tip}}{(u-1)2B_s^{SUL}} \qquad \text{Equation 1}$$

Wherein $W^{tip}$ is the width of the write head tip, $\gamma$ is unitless and represents the ratio associated with the write pole saturation level and flux leakage, u is the permeability of the SUL, and $B^{tip}$ is moment of the tip, and $B^{SUL}$ is the moment of the SUL. Typically, $\gamma<1$ but is close to 1 and depends on the head and media design, and, therefore, needs to be determined by experiment. While h can be any thickness, preferably, h is greater than 25% of $W^{tip}$.

Once h for the SUL has been determined, the thickness, position, and moment of each sub-underlayer may be determined. While two and three sub-underlayers are shown in the examples below, any number of sub-underlayers may be used. Each of the sub-underlayers may be of the same material/moment, differing materials, or any combination thereof. The sub-underlayers may be any soft magnetic material, including but not limited to, Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC. While the magnetic fields of each sub-underlayer may have any moment, preferably the moment of each sub-underlayer is within the range of 1 T to 2.4 T. Additionally, while any thickness sub-underlayer may be used, preferably, the thickness of each sub-underlayer is within the range of 10 nm to 18 nm, so long as the total thickness of the sub-underlayers is equal to or greater than h.

As distance between the hard recording layer and the sub-underlayers increases, the impact of the magnetic field of the sub-underlayers on the hard recording layer decreases. Therefore, the choice of the material/moment and thickness of the sub-underlayers should be chosen so that the magnetic fields of all of sub-underlayers substantially cancel each other in dynamic reversal operation so that the net magnetic field experienced by the hard recording layer from the SUL is reduced, preferably substantially zero.

Each sub-underlayer is coupled to the adjacent sub-underlayer using anti-ferromagnic coupling (AFC). In AFC, the direction of the magnetic field in each sub-underlayer is in an opposite direction of the magnetic field in the adjacent sub-underlayers.

The contribution of each sub-underlayer to STE depends upon the moment ($M_s$) and thickness (t) of each sub-underlayer. The greater $M_s t$ of each sub-underlayer, the more potential there is for STE. However, the impact of the sub-underlayer on the hard recording layer decreases with distance from the hard recording layer.

In a preferred embodiment, the sub-underlayers may be arranged so that the total magnetic field experienced by the hard recording layer, resulting from the fields emanating from each sub-underlayer, is approximately zero during ground state, i.e. while the media is not rotating or writing. This condition corresponds in most cases to a situation where a product of the respective moments and thicknesses of the sub-underlayers are equal to each other. However, in other embodiments, it is possible for there to be a slight net field emanating from the SUL and experienced by the hard recording layer. This condition often corresponds to a situation where a product of the respective moments and thicknesses of each layer are not equal to each other.

A principal condition to be satisfied by selection and relative arrangement of the sub-underlayers is that a vector sum of the magnetic fields experienced at a location in the hard recording layer be reduced from a sum of their respective magnitudes, and preferably that the vector sum be approximately zero, which can be viewed as substantial cancellation of the respective fields from each sub-underlayer. For example, at least one of the relative thickness, relative position, and relative moment of the sub-underlayers can be chosen such that the vector sum of the magnetic fields emanating from each sub-underlayer, at a location inside the hard recording layer, is reduced during dynamic reversal. In sum, the sub-underlayers are designed so that during dynamic reversal process, the total demagnetization field generated from the sub-underlayers, during rotation and writing (application of a magnetic field from a read or write head) cancel each other to produce a net field in the hard recording layer that is reduced, preferably approximately to zero.

In the embodiments having two sub-underlayers, the product of the moment and the thickness of the first sub-underlayer may be equal to, greater than, or less than the product of the moment and the thickness of the second sub-underlayer, as shown in Equations 2-4. It is generally preferred that the relationship between the moments and thicknesses defined by equation 2 be provided, if possible, while satisfying the dynamic reversal requirement. This condition corresponds with reduced presence of net charge in the SUL at ground state. However, this condition can be relaxed to achieve the dynamic reversal condition described above. The following paragraphs also explain that the SUL can be composed of more than two sub-underlayers, and the discussion above concerning the dynamic reversal condition applies to these examples also.

$$MS_1 t_1 = Ms_2 t_2 \qquad \text{Equation 2}$$

$$MS_1 t_1 > Ms_2 t_2 \qquad \text{Equation 3}$$

$$MS_1 t_1 < Ms_2 t_2 \qquad \text{Equation 4}$$

Figure 7:
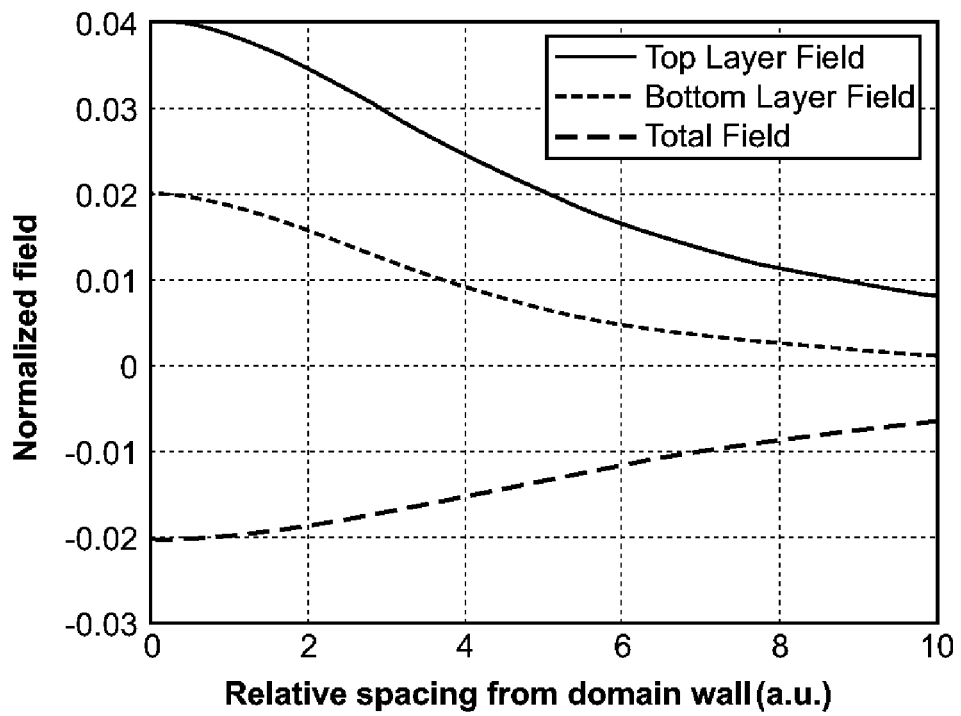
FIG. 7 depicts a net field produced by an SUL with two symmetric sub-underlayers.

FIG. 7 depicts an example of the field produced by an SUL wherein Equation 2 is used to determine the relationship between the two sub-underlayers. The solid line represents the field produced by the top sub-underlayer, the dashed line represents the field produced by the bottom sub-underlayer, and the dotted line represents the total field produced by the SUL.

Figure 8:
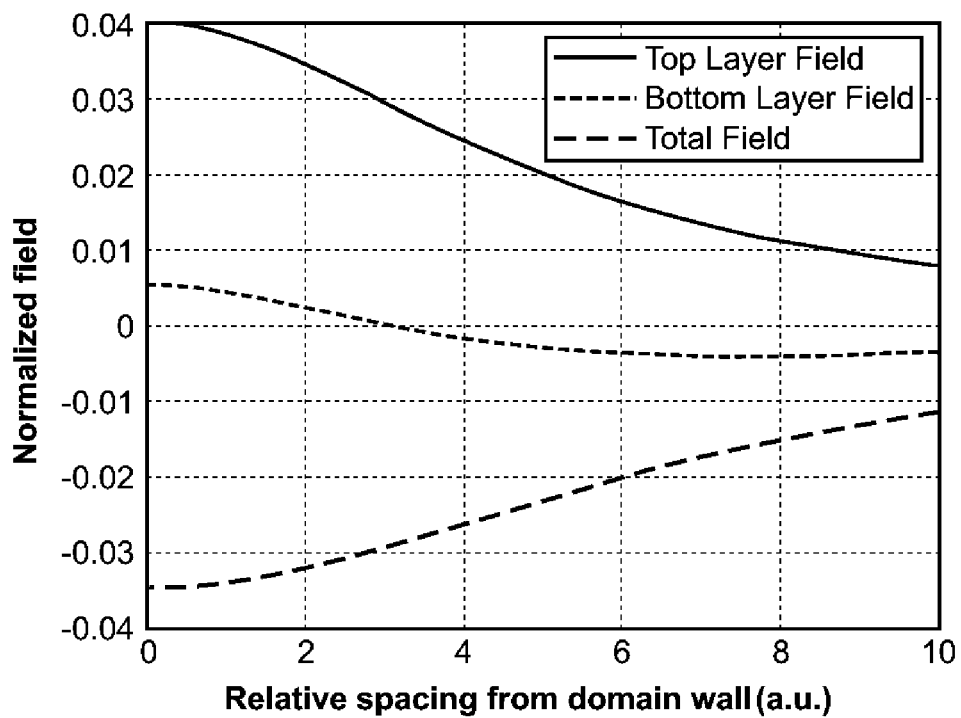
FIG. 8 depicts an example of the net field produced by an SUL with two asymmetric sub-underlayers disposed to cause destructive interference of their respective magnetic fields generated responsive to a dynamic reversal field.

FIG. 8 depicts an example of the field produced by an SUL wherein Equation 3 is used to determine the relationship between the two sub-underlayers. Specifically, in this example, $MS_1t_1=0.6*Ms_2t_2$. The solid line represents the field produced by the top sub-underlayer, the dashed line represents the field produced by the bottom sub-underlayer, and the dotted line represents the total field produced by the SUL. As can be seen by comparing FIG. 7 to FIG. 8, the total field in FIG. 8 is smaller, and thus more preferable, than the total field in FIG. 7. Also, FIG. 8 illustrates there are one or more points through the thickness of the hard recording layer where the vector sum of the normalized fields is zero. Other notable characteristics of the asymmetrical approach illustrated by the example of FIG. 8 is that the total field strength decays more rapidly to zero (i.e., at locations closer to the interface between the sub-underlayer closest to the hard recording layer, the total field strength is less in the asymmetrical case than in the symmetric case. One particular notable aspect then, is that even though $MS_1t_1$ does not equal $Ms_2t_2$, which implies presence of a ground state charge, generally thought to be undesirable, the total field strength during dynamic reversal can be made less and decay more rapidly than an example (FIG. 7) where $MS_1t_1=Ms_2t_2$. In some embodiments, the sub-underlayers can be deposited and relatively disposed so that the vector magnetic field sum is zero at about a middle of a thickness direction of the hard recording layer.

In the embodiments having three sub-underlayers, the sum of the product of the moment and the thickness of the first sub-underlayer and the product of the moment and the thickness of the third sub-underlayer may be equal, greater than, or less than the product of the moment and the thickness of the second sub-underlayer, as shown in the following equations:

$$MS_1t_1+Ms_3t_3=Ms_2t_2 \quad \text{Equation 5}$$

$$MS_1t_1+Ms_3t_3<Ms_2t_2 \quad \text{Equation 6}$$

$$MS_1t_1+Ms_3t_3>Ms_2t_2 \quad \text{Equation 7}$$

In certain embodiments, the moment of a first sub-underlayer is not equal to the moment of a second sub-underlayer. In other embodiments, the thickness of a first sub-underlayer is not equal to the thickness of a second sub-underlayer. In yet other embodiments, the perpendicular anisotropy of a first sub-underlayer is not equal to the perpendicular anisotropy of a second sub-underlayer.

EXAMPLES

A first example of possible material constituents of an SUL may be: b % of (e % of FE and a % of Co), c % of Cr, and d % of B. Where the percentages are atomic percentages and a is between 34 and 36, c is between 10 and 22, d is between 10 and 14, e=100−a, and b=100−(c+d).

A second example of possible material constituents of an SUL may be: a % of Co, b % of Zr, c % of Ta, and d % of Nb. Where the percentages are atomic percentages and b is between 2 and 7, c is between 0 and 12, d is between 0 and 12, and a=100−(b+c+d). Additionally the total of c and d is between 4 and 12.

A third example of possible material constituents of an SUL may be: a % of Co, b % of Fe, c % of Zr, d % of Ta, and e % of Nb. Where the percentages are atomic percentages and b is between 10 and 30, c is between 3 and 6, d is between 0 and 10, e is between 0 and 10, and a=100−(b+c+d+e). Additionally the total of d and e is between 3 and 12.

Figure 3:
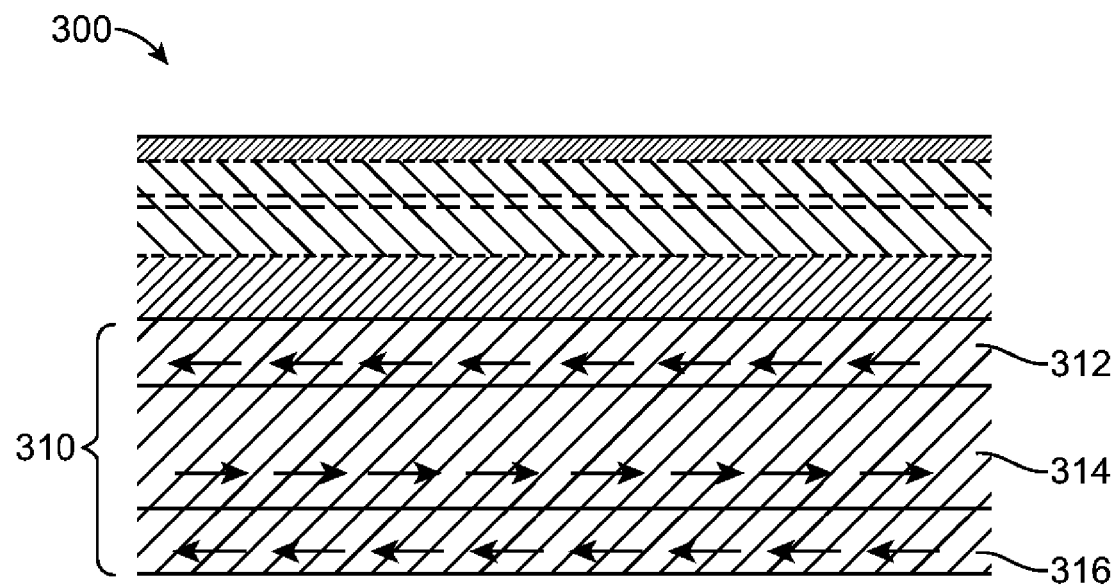
FIG. 3 depicts a perpendicular recording media having an SUL composed of three sub-underlayers of the same moment.

FIG. 3 depicts an example 300 wherein three sub-underlayers 312, 314, and 316, all of the same material and all of the same moment, compose SUL 310. In embodiment 300, sub-underlayers 312 and 316 are both magnetized in the same direction while sub-underlayer 314 is magnetized in the opposite direction. Additionally, sub-underlayers 312 and 316 both have a smaller thickness than a thickness of sub-underlayer 314. The thickness of each sub-underlayer is chosen such that a combined demagnetization field effect of sub-underlayers 312 and 316 experienced by the hard recording layer substantially cancels a demagnetization field effect of sub-underlayer 314 experienced by the hard recording layer.

Figure 4:
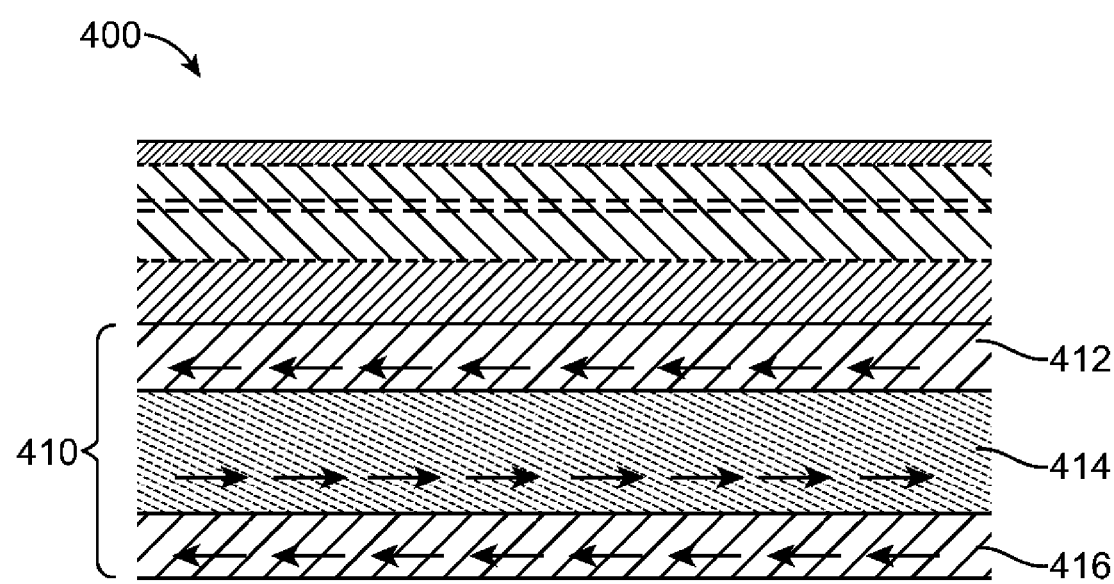
FIG. 4 depicts a perpendicular recording media having an SUL composed of three sub-underlayers of different moments.

FIG. 4 depicts another example 400 wherein the SUL 410 has three underlayers. In embodiment 400, sub-underlayers 412 and 416 are of one material and sub-underlayer 414 is of a second material. Therefore, sub-underlayers 412 and 416 have a first moment, while sub-underlayer 414 has a second moment. Additionally, sub-underlayers 412 and 416 are both magnetized in the same direction while sub-underlayer 414 is magnetized in the opposite direction. The materials, moments, and thicknesses of each sub-underlayer are chosen such that a combined effect of sub-underlayers 412 and 416 experienced by the hard recording layer substantially cancels an effect of sub-underlayer 414 experienced by the hard recording layer.

Figure 5:
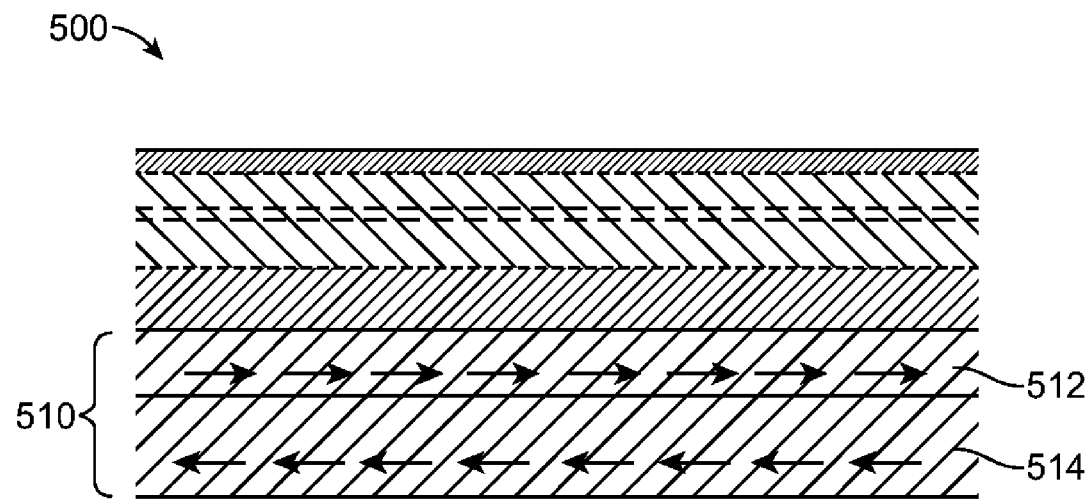
FIG. 5 depicts a perpendicular recording media having an SUL composed of two different thickness sub-underlayers of the same moment.

FIG. 5 depicts an example 500 wherein the SUL 510 has two sub-underlayers 512 and 514 of the same material. Sub-underlayer 512 is magnetized in a first direction while sub-underlayer 514 is magnetized in a second opposite direction. The thickness of each sub-underlayer is chosen such that an effect of sub-underlayer 512 experienced by the hard recording layer substantially cancels an effect of sub-underlayer 514 experienced by the hard recording layer.

Figure 6:
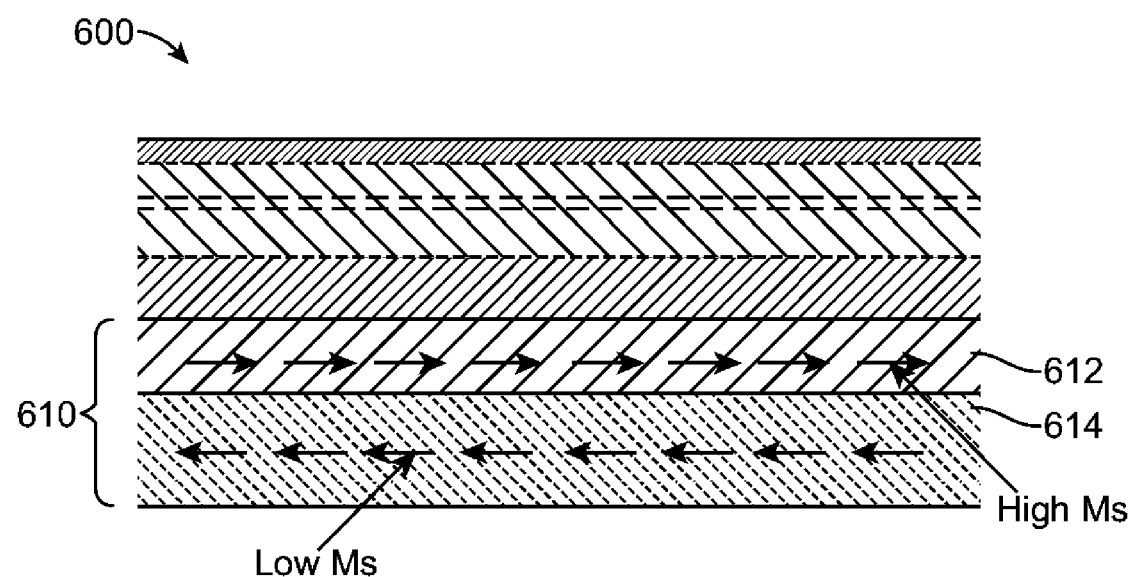
FIG. 6 depicts a perpendicular recording media having an SUL composed of two different thickness sub-underlayers of different moments.

FIG. 6 depicts an example 600 wherein the SUL 610 has two sub-underlayers 612 and 614 of the differing material and different moments. Sub-underlayer 612 is magnetized in a first direction while sub-underlayer 614 is magnetized in a second opposite direction. The materials, moments, and thicknesses of each sub-underlayer are chosen such that the effect of sub-underlayer 612 experienced by the hard recording layer substantially cancels the effect of sub-underlayer 614 experienced by the hard recording layer.

Methods for producing media according to these disclosures includes depositing an SUL on a substrate, or on one or more intervening layers on a substrate, and depositing a hard recording layer on the SUL. The SUL is formed from at least two AFC sub-underlayers. Each AFC sub-underlayer is deposited with a particular material selection, a thickness, and a magnetic moment. The total SUL thickness also can be determined according to the disclosures above. The number of AFC sub-underlayers, their respective material selection, thickness and magnetic moment are determined based on a goal of causing constructive interference of their respective magnetic fields generated responsive to a dynamic reversal field at one or more points in the hard recording layer. Selections for such variables can be according to the examples and other disclosures provided above.

Other aspects include a method of constructively interfering two or more respective magnetic fields generated by respective sub-underlayers of a SUL in a recording media responsive to dynamic reversal fields applied by a read or write head. The constructive interference is to be caused in a hard recording layer, such that a vector magnitude of the respective fields reflects such cancellation and establishes a reduced total perceived field at those points in the hard recording layer from the SUL.

The foregoing description and drawings of disclosed examples and other aspects are merely illustrative of the disclosed principles. Various modifications can be made to the examples by those skilled in the art without departing from the spirit and scope of the invention, which is defined in the appended claims.

We claim:

1. A device comprising:
   a substrate;
   a hard magnetic layer; and
   a Soft UnderLayer (SUL) formed between the substrate and the hard magnetic layer and comprising:
      a first sub-underlayer; and
      a second sub-underlayer, wherein
         the first sub-underlayer and the second sub-underlayer are adjacent and anti-ferromagnetically coupled (AFC),
         one of the sub-underlayers deposited to differ in one or more of thickness, magnetic moment, and anisotropy from the other sub-underlayer,
         respective magnetic field responses of each sub-underlayer to a magnetic field established during dynamic reversal interfere to create a total SUL magnetic field response to the dynamic reversal magnetic field that is approximately zero at one or more points in the hard magnetic layer, and
         the second sub-underlayer has a greater magnetic moment and is further away from the hard magnetic layer than the first sub-underlayer.

2. The media of claim 1, wherein the first sub-underlayer is thinner than the second sub-underlayer.

3. The media of claim 1, wherein the minimum thickness of the SUL is determined by $$h_{min}^{SUL} = \gamma \frac{(u+1)W^{tip}B_s^{tip}}{(u-1)2B_s^{SUL}},$$

wherein, h is the minimum thickness of the SUL, $W^{tip}$ is the width of the writer pole, $\gamma$ is the ratio associated with the write pole saturation level and flux leakage, u is the permeability of the SUL, $B^{tip}$ is the moment of the tip, and $B^{SUL}$ is the moment of the SUL.

4. The media of claim 1, wherein either $Ms_1t_1<Ms_2t_2$ or $Ms_1t_1>Ms_2t_2$ holds, wherein $Ms_1$ and $t_1$ respectively are the moment and thickness of the sub-underlayer closer to the hard magnetic layer and $Ms_2$ and $t_2$ respectively are the moment and thickness of the sub-underlayer farther from the hard magnetic layer, and the total SUL field strength decays more rapidly than a total field strength produced by a dual layer SUL with $Ms_1t_1=Ms_2t_2$ under the same dynamic reversal field.

5. The media of claim 1, further comprising a third sub-underlayer.

6. The media of claim 5, wherein the three sub-underlayers are chosen such that one of the conditions $Ms_1t_1+Ms_3t_3=Ms_2t_2$, $Ms_1t_1+Ms_3t_3>Ms_2t_2$ $Ms_1t_1+Ms_3t_3<Ms_2t_2$ holds, wherein Ms is the moment of respective underlayers and t is the thickness of respective underlayers.

7. A method comprising:
   depositing a soft underlayer (SUL) on a substrate; and
   depositing a hard recording layer on the SUL, wherein
   said depositing the SUL includes depositing:
      a first sub-underlayer; and
      a second sub-underlayer such that the second sub-underlayer is further away from the hard recording layer than the first sub-underlayer, wherein
         the first sub-underlayer and the second sub-underlayer are anti-ferromagnetically coupled (AFC) sub-underlayers,
         the first sub-underlayer and the second sub-underlayer are in a relative configuration selected so that each SUL sub-underlayer produces a respective magnetic field responsive to a dynamic reversal magnetic field, each respective magnetic field of a magnitude and polarity to cause destructive interference between the sub-underlayer fields at one or more points in the hard recording layer, reducing a total field perceived by the hard recording layer emanating from the SUL at those points to approximately zero at one or more points in the hard recording layer, and
         the second sub-underlayer has a greater magnetic moment than the first sub-underlayer.

8. The method of claim 7, further comprising determining the total thickness of the SUL based on:

$$h_{min}^{SUL} = \gamma \frac{(u+1)W^{tip}B_s^{tip}}{(u-1)2B_s^{SUL}},$$

wherein, h is the minimum thickness of the SUL, $W^{tip}$ is the width of the writer pole, $\gamma$ is the ration associated with the write pole saturation level and flux leakage, u is the permeability of the SUL, $B^{tip}$ is the moment of the tip, and $B^{SUL}$ is the moment of the SUL, and the at least two sub-underlayers are of at least two different materials and moments and thicknesses.

9. A media comprising:
   a substrate;
   a hard recording layer; and
   a Soft UnderLayer (SUL) formed between the substrate and the hard recording layer and comprising at least two anti-ferromagnetically coupled (AFC) sub-underlayers, at least one of the sub-underlayers deposited to differ in one or more of thickness, magnetic moment, and anisotropy from the other sub-underlayers, wherein a vector sum of magnetic fields emanating from each sub-underlayer, at a location inside the hard recording layer during dynamic reversal, is substantially zero, and wherein further one of the sub-underlayers has a greater magnetic moment and is further away from the hard recording layer than the other sub-underlayer.

10. The media of claim 9, wherein the other sub-underlayer is thinner than the sub-underlayer having a greater magnetic moment.

11. The media of claim 9, wherein the minimum thickness of the SUL is determined by $$h_{min}^{SUL} = \gamma \frac{(u+1)W^{tip}B_s^{tip}}{(u-1)2B_s^{SUL}},$$

wherein, h is the minimum thickness of the SUL, $W^{tip}$ is the width of the writer pole, $\gamma$ is the ratio associated with the write pole saturation level and flux leakage, u is the permeability of the SUL, $B^{tip}$ is the moment of the tip, and $B^{SUL}$ is the moment of the SUL.

12. The media of claim 9, wherein either $Ms_1 t_1 < Ms_2 t_2$ or $Ms_1 t_1 > Ms_2 t_2$ holds, wherein $Ms_1$ and $t_1$ respectively are the moment and thickness of the sub-underlayer closer to the hard recording layer and $Ms_2$ and $t_2$ respectively are the moment and thickness of the sub-underlayer farther from the hard recording layer, and the total SUL field strength decays more rapidly than a total field strength produced by a dual layer SUL with $Ms_1 t_1 = Ms_2 t_2$ under the same dynamic reversal field.

13. The media of claim 9, wherein there are three sub-underlayers.

14. The media of claim 13, wherein the three sub-underlayers are chosen such that one of the conditions $Ms_1 t_1 + Ms_3 t_3 = Ms_2 t_2$, $Ms_1 t_1 + Ms_3 t_3 > Ms_2 t_2$ $Ms_1 t_1 + Ms_3 t_3 < Ms_2 t_2$ holds, wherein Ms is the moment of respective underlayers and t is the thickness of respective underlayers.

15. The media of claim 9, wherein the SUL includes two sub-underlayers, and the sub-underlayer farther from the hard recording layer exhibits a higher normalized field strength, measured at a point in the hard recording layer where the total SUL field is approximately zero, than a corresponding layer of a different SUL meeting the condition that $Ms_1 t_1 = Ms_2 t_2$, wherein $Ms_1$ and $t_1$ respectively are the moment and thickness of the sub-underlayer closer to the hard recording layer and $Ms_2$ and $t_2$ respectively are the moment and thickness of the sub-underlayer farther from the hard recording layer, in response to the same dynamic reversal field strength.

* * * * *